United States Patent [19]
Keillor

[11] 4,160,585
[45] Jul. 10, 1979

[54] SPECIAL EFFECTS DEVICE
[76] Inventor: Warren Keillor, 201-3 Centre St., Markham, Ontario, Canada, L3P 3P9
[21] Appl. No.: 834,434
[22] Filed: Sep. 19, 1977
[51] Int. Cl.² ............................................. G03B 21/32
[52] U.S. Cl. ....................................... 352/87; 352/48; 352/55; 352/85; 352/90
[58] Field of Search ...................... 352/48, 54, 55, 85, 352/87, 88, 90

[56] References Cited
U.S. PATENT DOCUMENTS

| 1,764,490 | 6/1930 | Artigue | 352/48 |
| 2,054,414 | 9/1936 | Fleischer | 352/87 |
| 2,312,158 | 2/1943 | Garity | 352/87 |
| 3,556,646 | 1/1971 | Guidi et al. | 352/87 |
| 3,610,745 | 10/1971 | Wilson | 352/85 |

Primary Examiner—Russell E. Adams
Attorney, Agent, or Firm—Y. G. Katsuyama

[57] ABSTRACT

A special effects device for use in motion pictures, television, and the like having an outer, middle and inner frame. The middle frame is mounted in the outer frame for translational movement relative thereto and the inner frame is mounted in the middle frame for translational movement relative to the middle frame. Motor means are provided to impart translational movements to the middle and inner frames. An object is supported within the inner frame and by co-ordinating the movements of the inner and middle frames, the object is put into motion. The outer frame may also be moved to give the object movement in the direction perpendicular to the movement of the middle and inner frames.

11 Claims, 7 Drawing Figures

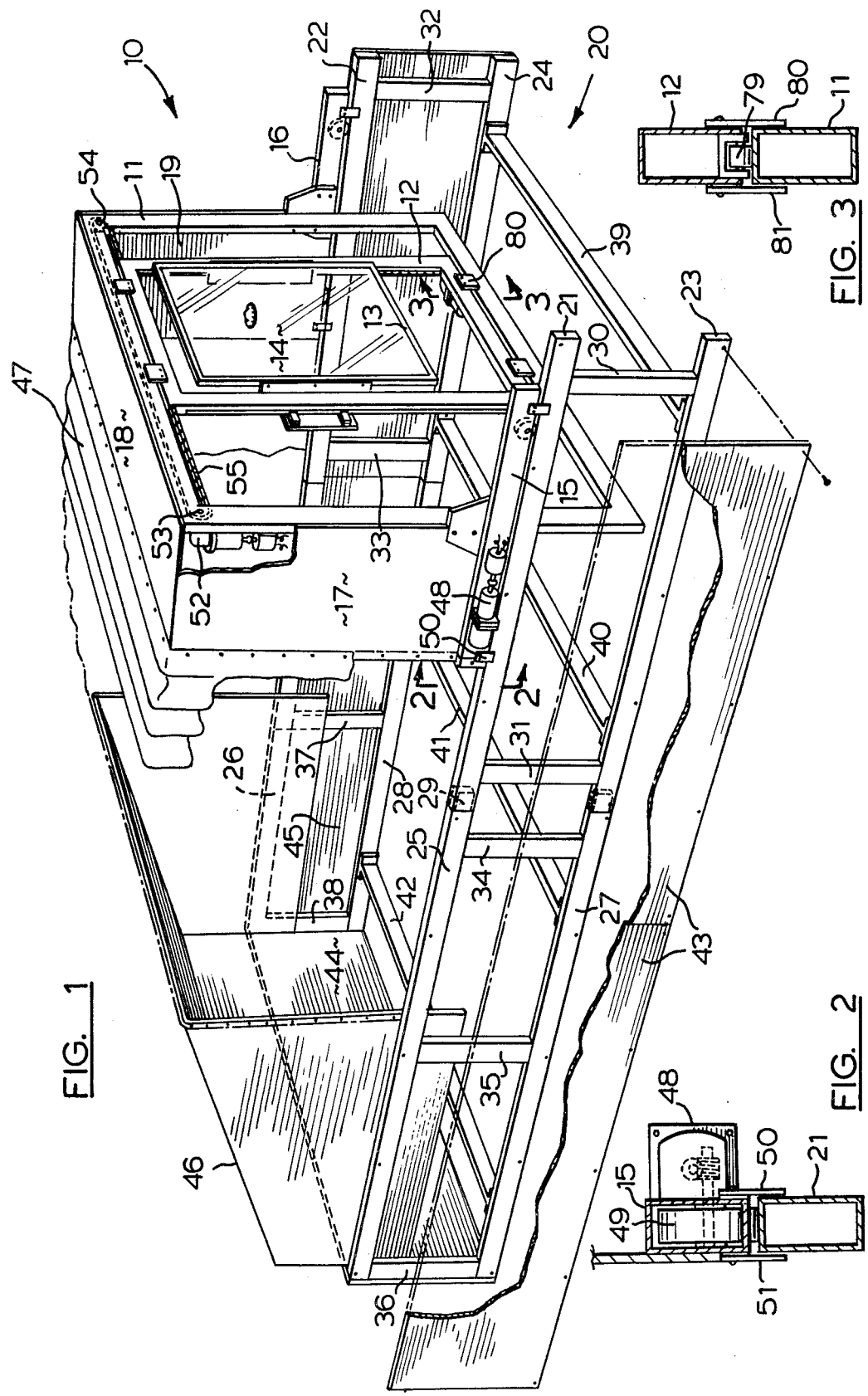

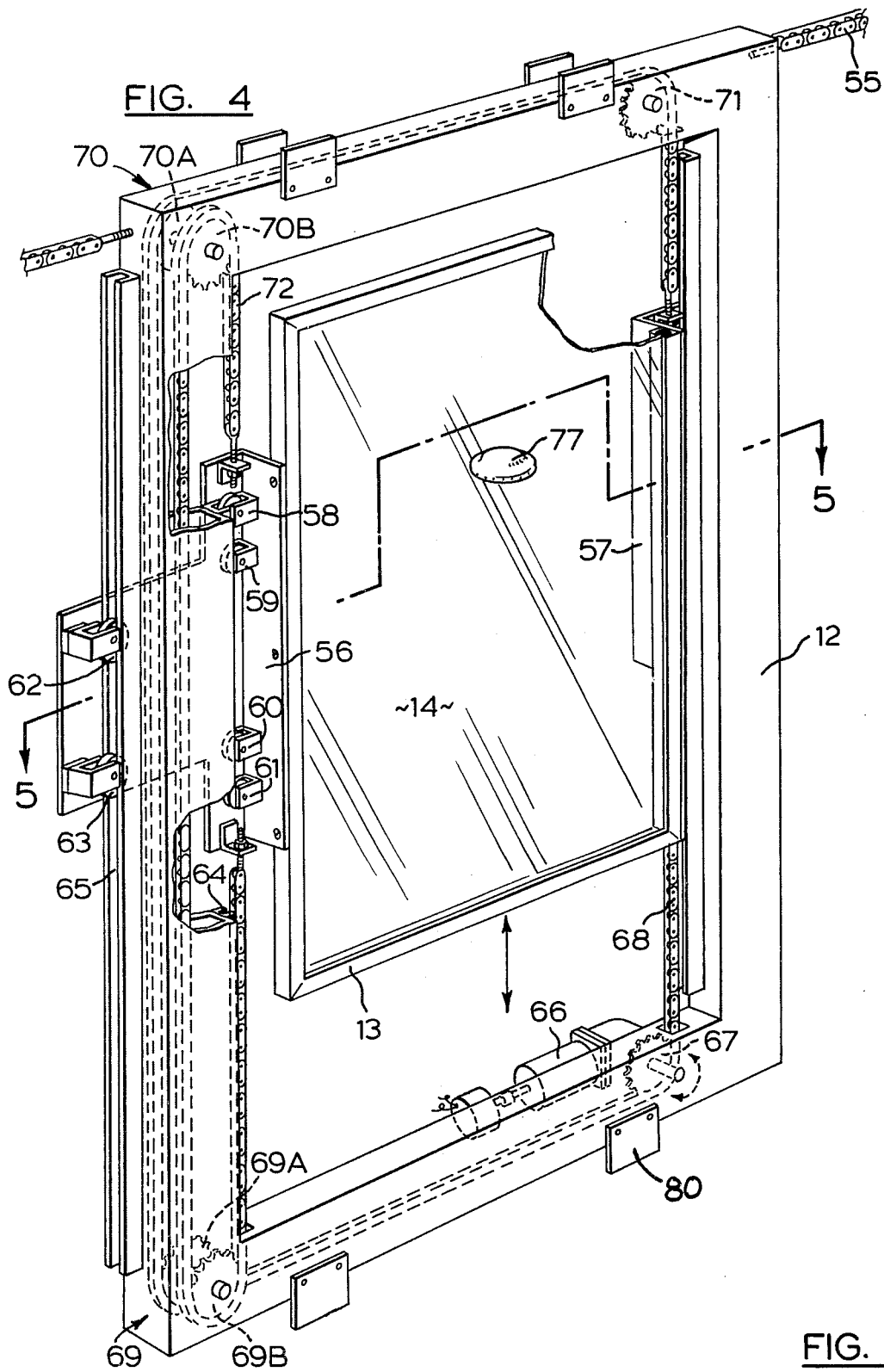
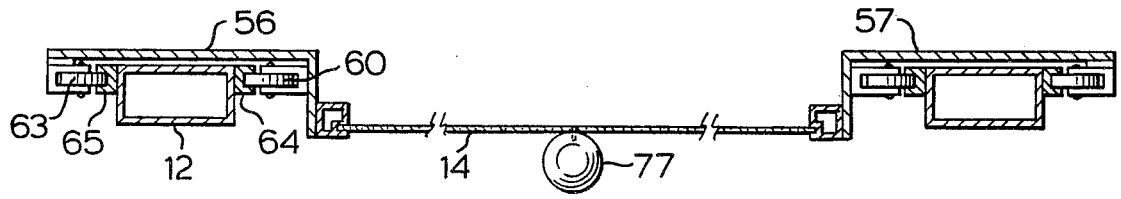

SPECIAL EFFECTS DEVICE

FIELD OF THE INVENTION

This invention relates to a special effects device for use in the motion picture and television industries.

BACKGROUND OF THE INVENTION

In the television and motion picture industries, special effects play an important role. Special effects may be created by a variety of devices or techniques which are usually costly and are time-consuming in operation. To create special effects, various known methods may be used. One method is the use of models, the movements of which are remotely controlled. One disadvantage of a remotely controlled model would be its cost especially if a number of models are required. Another disadvantage would be the difficulty in controlling such models. Another method is the use of wires on which models may be attached. One problem with the use of wires is that the manoeuverability of the objects on the wires is limited. Another problem would be the difficulty in using the models with actors since the wires may interfere with or restrict the movements of the actors. A further problem with the use of wires is that the wires sometimes are visible to the viewer. A further method is optical printing wherein the object is superimposed frame by frame on a background film. This method is extensively used in the film industry even though it is a time consuming and costly method. A further method is to shoot the background and the object frame by frame and the object is relocated for each subsequent frame being shot. Again this method proves to be a very expensive way of creating special effects and it limits the use of certain backgrounds in that no movement in the background can be filmed at the same time unless each and every object in the background is relocated to produce movement.

It is therefore an object of the present invention to overcome the foregoing problems by providing a special effects device which is easily operated and controlled, relatively inexpensive, portable, and allows the filming of objects in motion as well as the background continuously and simultaneously.

BRIEF SUMMARY OF THE INVENTION

The present invention is directed to a device for creating special effects for motion pictures, television and the like wherein objects which cannot move by themselves are made to appear to move without the mode of the motion being visible or apparent to the audience of the film being viewed.

According to the invention there is provided a special effects device for use in motion pictures, television and the like comprising an outer frame, a middle frame and an inner frame. The middle frame is mounted on the outer frame for translational movement relative thereto and the inner frame is mounted on the middle frame for translational movement relative thereto. There is provided a means for imparting the translational movements to the middle frame and to the inner frame. There is also provided a means for supporting an object within the inner frame. There is also provided a means for coordinating the movements of the inner and middle frames. The arrangement of the frames are such that by coordinating the movements of the inner and middle frames translational movement is imparted to the object supported within the inner frame.

According to an aspect of this invention the outer frame may be mounted on a stand. The outer frame is adapted to move along the stand in a direction perpendicular to the plane of movement of the middle and inner frames. There is also a means provided for imparting such movement to the outer frame.

BRIEF DESCRIPTION OF THE DRAWINGS

These and other objects, advantages and features of the invention will become apparent in the following detailed description of the preferred embodiments of the invention as shown in the drawings wherein:

FIG. 1 is a perspective view of the general arrangement of the special effects device mounted on a stand with portions cut away to show details.

FIG. 2 is a cross-sectional view taken along line 2—2.

FIG. 3 is a cross-sectional view taken along line 3—3.

FIG. 4 is a perspective view of the middle and inner frames with portions cut away to show details.

FIG. 5 is a cross-sectional view taken along line 5—5.

DETAILED DESCRIPTION OF THE PREFERRED EMBODIMENTS OF THE INVENTION

Figure 6:
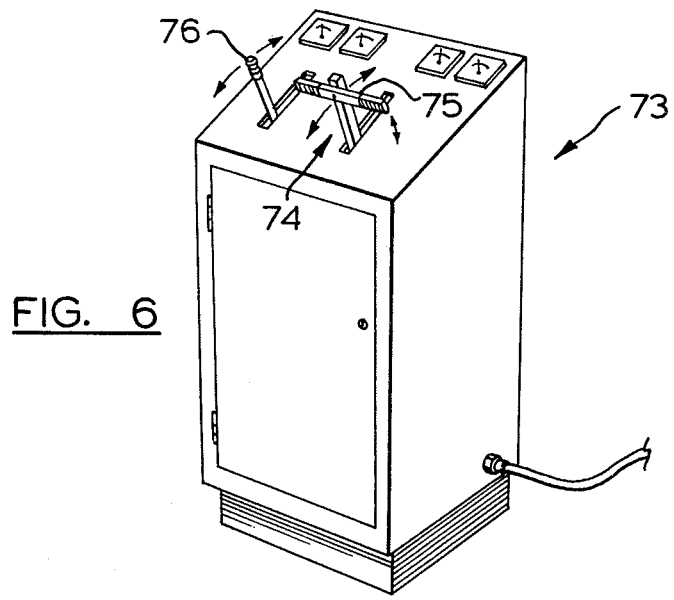
FIG. 6 is a perspective view of the control console which controls the movement of the frames.

With reference to the drawings there is shown a preferred embodiment of the invention. The special effects device generally designated as 10 comprises an outer frame 11 on which is mounted a middle frame 12 and which in turn has mounted thereon the inner frame 13. The inner frame 13 is covered by a transparent material 14 such as glass or other suitable transparent material. The perimeter of frame 13 defines the area within which components of special effects may be located. The outer frame 11 is mounted on short beams 15 and 16 which are perpendicular to the frame. The top half of the outer frame 11 is covered by plywood material 17, 18 and 19.

The stand on which the outer frame 11 is mounted, is generally designated at 20. The stand comprises longitudinal beams 21 to 28 inclusive. Beams 25 to 28 inclusive are connected to beams 21 to 24 inclusive by inserting the reduced end of beams 25 to 28 inclusive into the open end of beams 21 to 24 inclusive. An example of this connection is shown and designated at 29. Beams 21 and 23 are connected by vertical cross pieces 30 and 31. Beams 22 and 24 are connected by cross beams 32 and 33. Beams 25 and 27 are connected by cross beams 34, 35 and 36 and beams 26 and 28 are connected by cross pieces 37 and 38. The longitudinal beams 23 and 24 are connected by horizontal cross beams 39 and 40. The longitudinal beams 27 and 28 are connected by horizontal cross pieces 41 and 42. The arrangement of the beams is such that it may be dismantled. The stand is enclosed by plywood coverings 43, 44 and 45.

At one end of the stand is a plywood canopy 46. A flexible bellows covering 47 is attached to the canopy 46 and plywood covering 17, 18 and 19 which complete the covering or enclosure of the stand 20. The interior walls of the covering are painted black to avoid the reflection of light from the inside of the stand off transparent material 14 and into the camera lens.

Short beams 15 and 16 are adapted to ride on longitudinal beams 21 and 22 respectively by means of wheels at both ends of short beams 15 and 16 and electric motor 48 on short beam 15 which drives wheel 49. Guides 50 and 51 and three similar sets of guides maintain the frame on beams 21 and 22, as can be seen in FIG. 1.

The bellows covering 47 allows the frame arrangement to move along beams 21 and 22 while maintaining the interior of the device 10 in a darken state. The direction of movement is perpendicular to the plane of outer frame 11 ie: in a direction towards and away from a camera which would be located under canopy 46.

The middle frame 12 is adapted for translation movement relative to the outer frame 11 by means of two rollers located at the bottom of frame 12, one of which rollers is designated as 79 in FIG. 3. Guides 80 and 81 and three similar pairs of guides maintain middle frame 12 on frame 11. An electric motor 52, sprockets 53 and 54 and chain 55 cause the middle frame 12 to move.

The inner frame 13 has angle brackets 56 and 57. The angle bracket 56 has roller arrangements as shown in FIG. 4 where the rollers are designated as 58 to 63 inclusive. A similar roller arrangement may be found on angle bracket 57. Rollers 58 to 61 inclusive ride in grooved track 64, located on the inside of vertical portion of frame 12. Rollers 62 and 63 ride in grooved track 65 located on the outside of vertical portion of frame 12. Similar grooved tracks may be found associated with roller arrangements on angle bracket 57.

The inner frame 13 and its associated angle brackets and rollers are driven by means of electric motor 66 for translational movement relative to the middle frame. Electric motor 66 is connected to and drives sprocket 67 which in turn drives chain 68. Chain 68 is connected at one end to angle bracket 57, around sprocket 67 to one half of double sprocket 69 designated as 69a, around a second double sprocket 70 designated as 70a, around single sprocket 71 and back to angle bracket 57.

In order to assure the smooth up and down movement of frame 13, a second chain 72 is used. One end of chain 72 is connected to angle bracket 56 around sprocket 69b and around sprocket 70b and the other end of chain 72 is connected back to angle bracket 56. Motors 48, 52 and 66 are connected to a control console 73 as shown in FIG. 6. A T-lever generally designated at 74 controls the movements of middle frame 12 and inner frame 13. By moving the T-lever fore and aft, it causes the inner frame 13 to move up and down and by moving the cross bar 75 of the T-bar 74 up and down, it causes the middle frame 12 to move horizontally. Stick lever 76 controls the movement of the frame 11 along beams 21 and 22.

A model of a flying saucer 77 is mounted on transparent material 14.

It is understood that for best effects, a camera having a wide-angle lens should be used in conjunction with the special effects device as disclosed. A further embodiment of the invention is that the device may be dismantled and transported to various locations.

Figure 7:
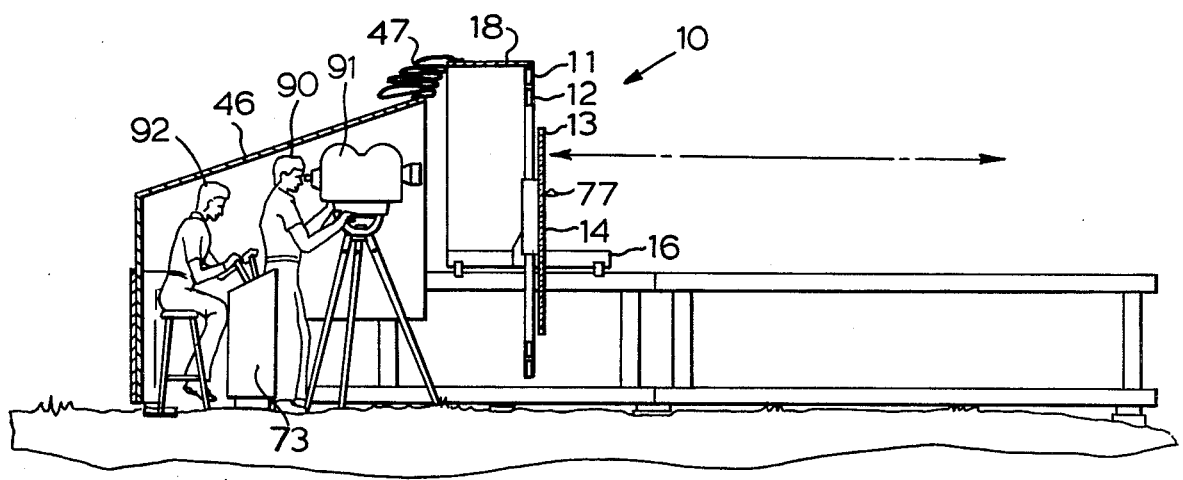
FIG. 7 is a diagramatic sectional view of the special effects device in use.

FIG. 7 shows the special effects device generally designated at 10 located on site for use in filming. The cameraman shown as 90 is operating a motion recording camera 91 within the enclosure of the special effects device 10. The operator of the special effects device shown as 92 is seated behind control console 73. The operator 92 and control console 73 are also located within the enclosure of the special effects device. With the special effects device set up on location and with the model of a flying saucer 77 mounted on the special effects device, the cameraman and the operator of the special effects device can coordinate the movements of the flying saucer with respect to the background. With the special effects device, actors may be used in conjunction with the model with the movements of the model and the actors being coordinated.

There is a great advantage in filming the model and the background simultaneously on site since this produces a first generation film whereas other special effects devices as previously explained requires the filming of the background and the filming of the movements of the object to take place separately resulting in a second generation film which inherently lacks quality.

The embodiments of the invention in which an exclusive property or privilege is claimed are defined as follows:

1. A special effects device for use in motion pictures, television and the like comprising of an outer frame, a middle frame and an inner frame; said middle frame mounted on said outer frame in a manner for translational movement relative to said outer frame and said inner frame mounted on said middle frame in a manner for translational movement relative to said middle frame; means for imparting translational movement to said middle frame; means for imparting translational movement to said inner frame; means for coordinating said transational movements; means for supporting an object within the perimeter of said inner frame; the arrangement of said frames being such that by coordinating the movements of said inner and middle frames translational movement is imparted to said object; said outer frame is mounted on a stand for movement in a direction perpendicular to the plane of movement of said middle and inner frames and means for imparting such movement to said outer frame.

2. A device as claimed in claim 1 wherein said means for imparting movement to said outer frame comprises an electric motor; means for imparting movement to said middle frame comprises an electric motor, two sprockets and a chain; means for imparting movement to said inner frame comprises an electric motor, two sprockets, two double sprockets and two chains; said electric motors connected to a control box for controlling the movements of said frames.

3. A device as claimed in claim 1 wherein said outer, middle and inner frames are substantially coplanar and said middle frame moves in a horizontal direction and said inner frame moves in a vertical direction.

4. A device as claimed in claim 1 wherein said means for supporting an object within the perimeter of said inner frame comprises a transparent material mounted in said inner frame and an attachment means for attaching said object to said transparent material.

5. A device as claimed in claim 1 wherein said stand comprises two spaced apart beams on which said outer frame is moveable in the direction of the longitudinal axis of said beams; a stationary canopy arrangement at one end of said beams; a flexible bellows arrangement one end of which is attached to said canopy and the other end attached to said outer frame; said canopy and bellows arrangement providing a cover for said stand.

6. A device as claimed in claim 5 wherein said frame and stand are adapted to be dismantled for transporting from one location to another.

7. A device as claimed in claim 5 wherein said means for imparting movement to said outer frame comprises an electric motor; means for imparting movement to said middle frame comprises an electric motor, two sprockets and a chain; means for imparting movement to said inner frame comprises an electric motor, two sprockets, two double sprockets and two chains; said electric motors connected to a control box for controlling the movements of said frames.

8. A device as claimed in claim 2 wherein said outer, middle and inner frames are substantially coplanar and said middle frame moves in a vertical direction and said inner frame moves in a horizontal direction.

9. A device as claimed in claim 8 wherein said means for supporting an object within said inner frame comprises a transparent material substantially covering the area bounded by said inner frame and an attachment means for attaching said object to said transparent material.

10. A device as claimed in claim 9 wherein said stand comprises two spaced apart beams on which said outer frame is moveable in the direction of the longitudinal axis of said beams; a stationary canopy arrangement at one end of said beam; a flexible bellows arrangement, one end of which is attached to said canopy and the other end attached to said outer frame; said canopy and bellows arrangement providing a cover for said stand.

11. A special effects device for use in motion pictures, television and the like comprising an outer frame, a middle frame and an inner frame; said middle frame mounted on said outer frame in a manner for translational movement relative to said outer frame and said inner frame mounted on said middle frame in a manner for translational movement relative to said middle frame; means for imparting translational movement to said middle frame; means for imparting translational movement to said inner frame; means for supporting an object within the perimeter of said inner frame; means for coordinating the movements of said frames; the arrangement of said frames being such that by coordinating the movement of said inner and middle frames translational movement is imparted to said object; said outer frame being mounted on a stand for movement in a direction perpendicular to the plane of movement of said middle and said inner frames; means for imparting such movement to said outer frame; said means for imparting movement to said outer frame comprising an electric motor; means for imparting movement to said middle frame comprising an electric motor, two sprockets and a chain; means for imparting movement to said inner frame comprising an electric motor, two sprockets, two double sprockets and two chains; said electric motor is connected to a control box for controlling the movement of said frames; said outer, middle and inner frames being substantially coplanar and said middle frame being moveable in a horizontal direction and said inner frame being moveable in a vertical direction; said stand comprising two spaced apart beams on which said outer frame is moveable in the direction of the longitudinal axis of said beams; a stationary canopy arrangement at one end of said beams; a flexible bellows arrangement, one end of which is attached to said canopy and the other end attached to said outer frame; said canopy and bellows arrangement providing a cover for said stand; said frames and stand being adapted to be dismantled for transporting from one location to another; said means for supporting an object within the perimeter of said inner frame comprising a transparent material mounted in said inner frame and an attachment means for attaching said object to said transparent material.

* * * * *